United States Patent [19]
Kelley et al.

[11] Patent Number: 5,794,349
[45] Date of Patent: Aug. 18, 1998

[54] POTATO AND VEGETABLE PEELER

[75] Inventors: Drew Kelley; Robert B. Skerker, both of Buffalo, N.Y.

[73] Assignee: Robinson Knife Manufacturing Company, Inc., Buffalo, N.Y.

[21] Appl. No.: 831,316

[22] Filed: Apr. 1, 1997

[51] Int. Cl.⁶ ............................................. B26B 1/02
[52] U.S. Cl. .................. 30/279.6; 30/342; 76/104.1
[58] Field of Search ............................ 30/279.6, 330, 30/342, 123.5, 123.6, 123.7, 340; 76/104.1

[56] References Cited

U.S. PATENT DOCUMENTS

D. 248,609  7/1978  Fischer .
2,232,940   2/1941  Fender .
2,961,766  11/1960  Maynard ........................... 30/342
3,465,437   9/1969  Brown ............................ 30/279.6
3,909,860  10/1975  Cantales .
3,956,825   5/1976  Ness .
4,841,638   6/1989  Bardeen et al. ................ 30/342 X
4,982,499   1/1991  Fortin .

*Primary Examiner*—Douglas D. Watts
*Attorney, Agent, or Firm*—Hedman, Gibson & Costigan, P.C.

[57] ABSTRACT

A potato-vegetable peeler structured with a longitudinally disposed shaftway to secure the peeler blade and facilitate cleaning of the peeler and shaftway and a method for making the peeler.

14 Claims, 4 Drawing Sheets

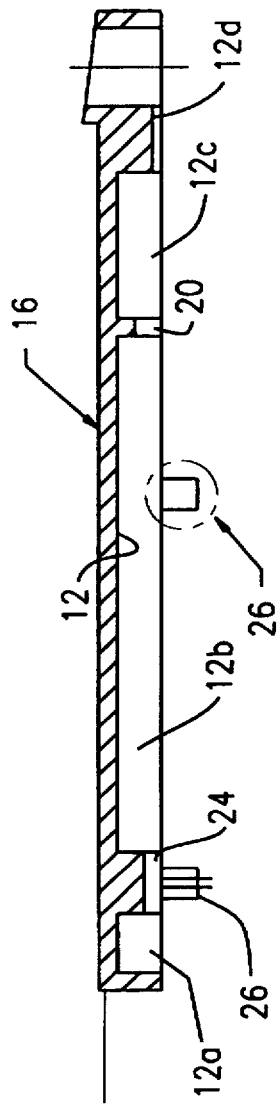
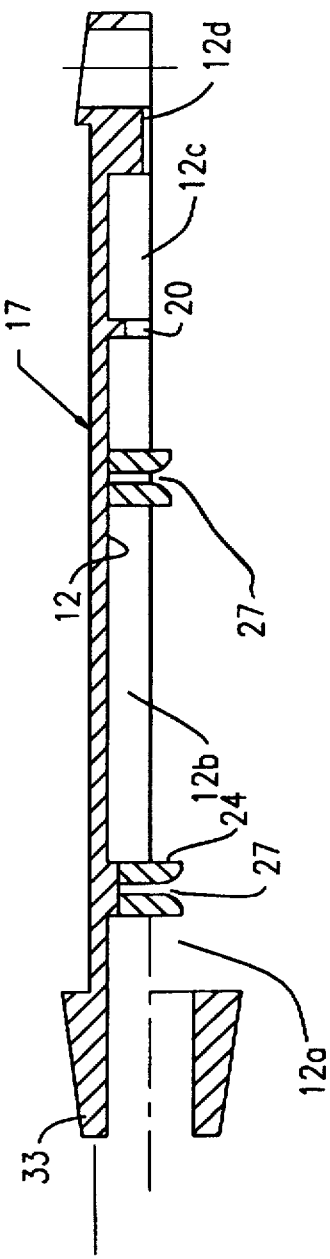
FIG. 2
FIG. 3

5,794,349

1

POTATO AND VEGETABLE PEELER

The present invention relates to a hand-held potato and vegetable peeler with a hygienic, easy to clean structure and a method for manufacturing the peeler.

BACKGROUND OF THE INVENTION

Hand held peelers for potatoes and vegetables are well known in the art. One very popular and non-problematic potato peeler that has endured for many years is depicted in U.S. Pat. No. 2,232,940 (Fender). However, other peelers of the prior art are problematic because use of the peeler during the peeling process yields detritus, certain amounts of which collect at the base of the peeler blade and between the handle. In conventional peelers, the accumulated detritus is difficult to clean, such that organic residue often remains after cleaning, and consequently, the accumulated residue can foster the breeding of bacteria on the utensil.

It is therefore an object of the present invention to provide a structure for potato and vegetable peelers that has a comfortable grip, is structurally sound and can be easily and effectively cleaned.

It is another object of the invention to provide a process for the manufacture of the peeler of the present invention.

SUMMARY OF THE INVENTION

Accordingly, the present inventions comprise an apparatus in the form of an improved peeler for removing the skin or a slice of a potato or vegetable, and a process for forming the peeler.

The apparatus or peeler utensil comprises a handle and a peeling blade secured to the handle. The handle section of the utensil includes a chamber which is longitudinally disposed within the length of the handle and extends from the location at which the blade meets the handle to the terminus of the handle.

The method of manufacture of the peeler essentially involves forming complementary top and bottom peeler handle sections with aligned longitudinal grooves or sulcus formations, crimping a conventional peeler blade around a shaft, laying the shaft into the sulcate formation on one handle section and snap fitting the complementary handle section onto the handle section on which the shaft has been placed and securing the complementary handle sections together. Thereafter, the resulting sub-assembly is over-molded with a soft durometer elastomer handle to form the completed peeler.

BRIEF DESCRIPTION OF THE DRAWINGS

Other objects and advantages of this invention may be seen from the following description when viewed in conjunction with the accompanying drawings wherein:

FIG. 2 is a side sectional-elevational view of one of the complementary half-sections of the core of the handle with the cross-shaped posts protruding also referred to herein as the bottom handle half-section.

FIG. 3 is a side sectional-elevational view of the structure of the other complementary half-section also referred to herein as the top handle half-section.

2

Figure 4:
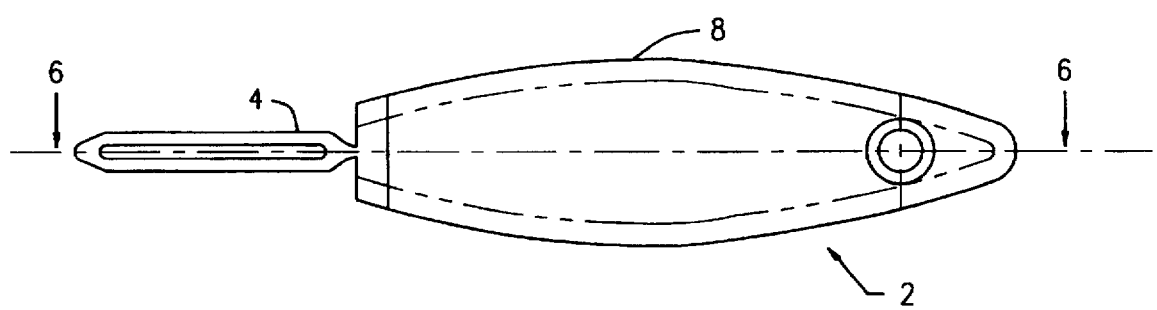
FIG. 4 is a top view of the assembled peeler.
Figure 6:
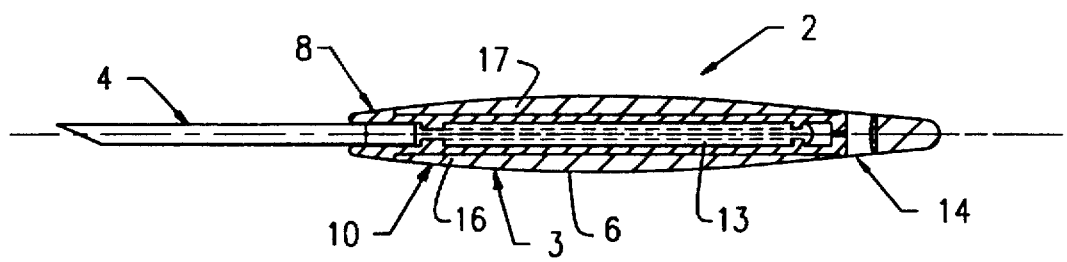

FIG. 6 is a side sectional elevational view of the peeler, taken through line 6—6 of FIG. 4.

Figure 7:
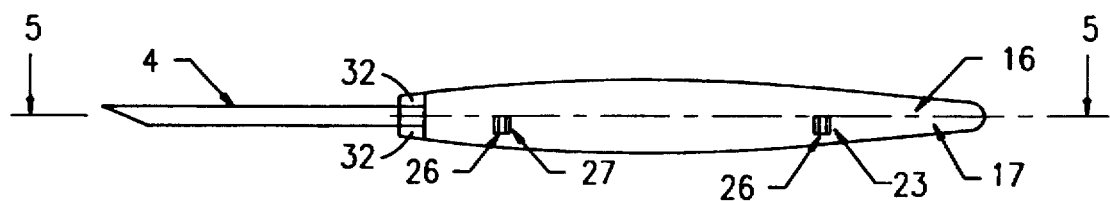

FIG. 7 is a side sectional view of the assembled peeler showing the complementary handle core halves snap fitted together with the posts 26 and mating holes 27 shown in phantom.

Figure 8:
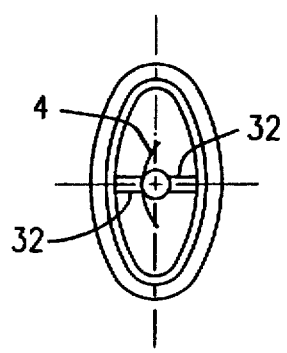

FIG. 8 is a frontal elevational view of the assembled peeler.

DESCRIPTION OF THE PREFERRED EMBODIMENT

As best seen in FIGS. 4–7 an embodiment of the peeler 2 is comprised primarily of a peeler blade 4, crimped around a peeler shaft 6, a peeler core handle 8, comprised of complementary half-sections 16 and 17 and an over-molded soft durometer handle surface 10.

Figure 1:
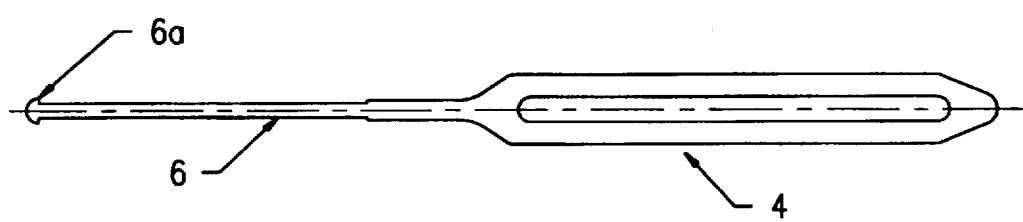
FIG. 1 is a longitudinal top view of the peeler blade crimped around the shaft.

In an especially preferred embodiment, both the blade 4 and the shaft 6, best seen in FIG. 1, are fabricated from metal, preferably stainless steel with a stop 6a formed on the shaft 6 at the end away from the blade 4.

The core handle 8 is made from polypropylene, and the soft durometer over-molded handle surface 10 is made of a thermoplastic elastomer, preferably an elastomer under the Santoprene trademark, manufactured by Advanced Elastomer Systems of Akron, Ohio, or an elastomer under the Monprene trademark manufactured by QST, Inc. of St. Albans, Vt.

With specific reference to FIGS. 2 and 3, the peeler core handle 8 is formed of complementary half-sections 16 and 17, that in the preferred embodiment are polypropylene members formed by injection molding.

As seen in FIG. 2 the bottom handle half-section 16 is formed with a longitudinally extending groove 12 having a configuration of essentially six parts; to wit, subchamber 12a, bottleneck 24, subchamber 12b, bottleneck 20, subchamber 12c and exit passage 12d. In addition posts 26 are formed to protrude upwardly. In the preferred embodiment the posts 26 are cruciform in cross-section.

As seen in FIG. 3 the top handle half-section 17 is formed with a groove 12 having a longitudinally extending configuration with essentially six parts; subchamber 12a, bottleneck 24, subchamber 12b, bottleneck 20, subchamber 12c and exit passage 12d, all of which are identical to the complementary groove parts formed in bottom handle half-section 16, such that the groove sections of top handle half-section 17 are configured to be aligned with the groove sections subchamber 12a, bottleneck 24, subchamber 12b, bottleneck 20, subchamber 12c and exit passage 12d on half-section 16. In addition, holes 27 are formed in the surface of top handle half-section 17 in alignment with the posts 26 extending from top handle half-section 16 to facilitate assembly of the core handle 8 by a snap fit of the posts 26 into the holes 27. The top handle half-section 17 is provided with a forward bolster end 33.

The preferred process for forming the half-sections 16 and 17 is injection molding polypropylene at 375°–550° F.

Figure 5:
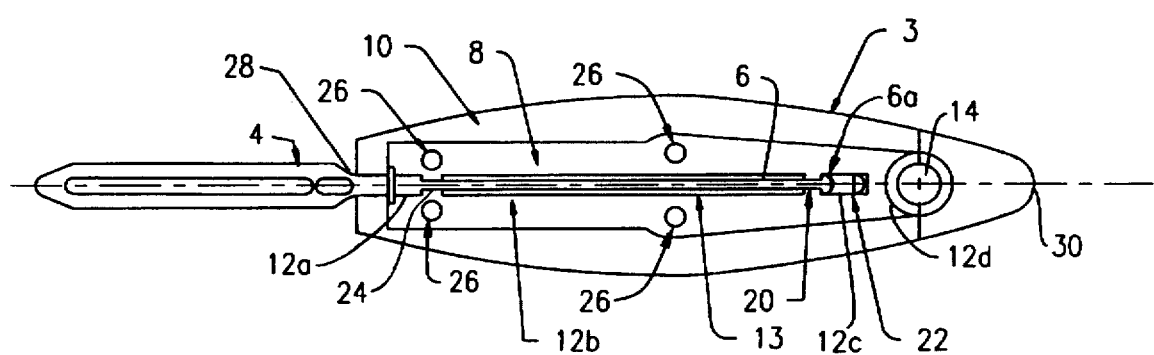
FIG. 5 is a sectional plan view of the assembled peeler taken through line 5—5 of FIG. 7.

Assembly of the handle core entails first locating the blade shaft 6 in the groove 12 of the top half-section 17 by inserting the blade shaft 6 through the bolster end 33 of section 17, then matching the core half 16 so as to securely interlock the two complementary half-sections 16 and 17 through the aid of posts 26, located on core half 16, into recesses 27, formed on handle half-section 17 as seen in FIG. 7. Interlocking of core halves 16 and 17 results in shaft 6 being locked as it rests within the longitudinal chamber or shaftway 13 formed by the mating grooves 12 of the core handle 8 as seen in FIGS. 5 and 6. Specifically, as seen in FIG. 5, the shaft 6 rests within the longitudinal chamber or shaftway 13 formed of the mating grooves 12 of the core handle 8, whereby the shaft 6 is secured through the aid of the bottleneck 20, which provides an interference member to bear against the shaft stop 6a and thereby prevent the shaft 6 from sliding out or popping out of the assembled core handle 8. Bottleneck 24 properly aligns the shaft 6 within the core handle 8 so as to prevent excessive lateral movement of the shaft 6 within the assembled handle 8.

In an especially preferred embodiment, the subchamber 12a will have a 0.230 inch diameter, bottleneck 24 has a 0.145 inch diameter, subchamber 12b has a 0.22 inch diameter, bottleneck 20 has a 0.145 inch diameter, subchamber 12c has a 0.250 inch diameter, and exit passage 12d has a 0.06 inch diameter. Hence, given a preferred shaft diameter of 0.125 inch, all of the chamber subcomponents allow for a minimum of 0.020 inch diameter allowance whereby the shaft 6 may be properly secured while still allowing for a continuous spatial communication within the shaftway 13 from one end of the peeler handle 28 to the other end of the peeler handle 30. This configuration insures a 0.010 inch allowance between the outside surface of the shaft 6 and the surface of the shaftway 13 to facilitate the flow of water or other solvent through the shaftway. It is maintained that such a shaftway configuration allows for ease of cleaning where organic matter and bacteria accumulate at the base of the peeler blade located at peeler handle end 28. Cleaning of said detritus is facilitated by the continuity of the longitudinal chamber which allows debris to be washed through the length of the body of the handle 8 where it exits from exit passage 12d to hanging hole 14.

Furthermore, as illustrated in FIGS. 7 and 8, angular movement of the blade 4 is constrained within a range of 45° motion by blade stops 32, which are integrally formed on the core handle 8 so as to protrude sufficiently to limit the rotation of the blade 4 and the shaft 6 within the assembled core handle 8.

With further reference to FIGS. 5 and 6, the assembled core handle 8 is over-molded with the aforementioned thermoplastic elastomer so as to essentially envelop the assembled core handle 8 surfaces. In a preferred embodiment, said over-molding is accomplished by means of an injection molding process at a temperature in the range of 300°–480° F. which will be well known to those skilled in the art. However, in the preferred embodiment, the core handle 8 is formed from polypropylene such that when the thermoplastic elastomer over-molding is injection molded on the core handle 8, a bond forms between the two, thereby allowing for secure application of the soft durometer handle 10.

Various modifications to the above invention will become apparent to those skilled in the art, all of which are intended to fall within the spirit and scope of the present invention, limited only by the appended claims. All patents and publications referred to herein are hereby incorporated by reference.

What is claimed is:

1. A vegetable and potato peeler comprising:
   a handle;
   a shaftway formed longitudinally throughout said handle;
   a peeler blade;
   a shaft on which said peeler blade is mounted; and
   means for rotatably securing said shaft in said shaftway and for affording the flow of liquid through said shaftway wherein the means for rotatably securing said shaft in said shaftway and for affording the flow of liquid through said shaftway is comprised of a stop on the end of the shaft opposite the peeler end and a shaftway formed of sub-passages comprised of at least one bottleneck chamber for securing said stop and positioned so as to laterally align said shaft in said shaftway without preventing the flow of said liquid through said shaftway, and shaftway entrance and exit holes.

2. The peeler of claim 1, wherein the handle is formed from polypropylene.

3. The peeler of claim 1, wherein the handle is over-molded with a thermoplastic elastomer.

4. The peeler of claim 3, wherein the thermoplastic elastomer is of the Santoprene trademark or Monoprene trademark varieties.

5. The peeler of claim 2 further comprising complementary half-sections to form said handle.

6. The peeler of claim 1, further comprising a hang hole and wherein said shaftway exist hole terminates in said hang hole.

7. The peeler of claim 5 further comprising means formed on the half-sections for providing securement of the half-sections into an assembled handle core.

8. A peeler as in claim 1 further comprising means for limiting the rotational movement of the peeler blade.

9. A peeler as in claim 2 wherein the shaftway and shaft are dimensioned with the minimum allowance between shaft surface and shaftway surface being 0.010 inch.

10. The process for forming a vegetable and potato peeler comprising the steps of:
    forming a first complementary half-section of a handle core in a configuration wherein said first complementary half-section has a half diameter groove extending substantially the length of the complementary half-section and a plurality of posts;
    forming a second half of a handle wherein the second complementary half-section has a half diameter of a longitudinal groove extending substantially the length of the complementary half-section and a plurality of recesses for receiving said posts of said first complementary half-section so as to afford a snap fit connection between the first and second complementary half-sections;
    forming a shaft on which a peeler blade is mounted;
    disposing said shaft within the longitudinal groove of a complementary half-section so as to leave the peeler blade exposed outside the complementary half-section;
    snap fitting the first and second complementary half-sections together such that the respective longitudinal grooves of each half align with and communicate with each other to define a shaftway and so as to form a core handle;
    injection molding thermoplastic elastomer onto the core handle to over-mold the handle.

11. The process of claim 10 further comprising the step of crimping the blade on the shaft.

12. The process of claim 10 wherein the complementary half-sections are formed from polypropylene by injection molding.

13. The process of claim 10 wherein the thermoplastic elastomer is of the Santoprene trademark or Monoprene trademark varieties.

14. The process of claim 10 wherein the half-sections are injection molded at 375°–550° F. and the over-molding of elastomer onto the core handle is at 300°–480° F.

* * * * *